June 2, 1953
A. W. JOHNSON
2,640,376
BORING MACHINE
Filed Feb. 8, 1951
2 Sheets-Sheet 2
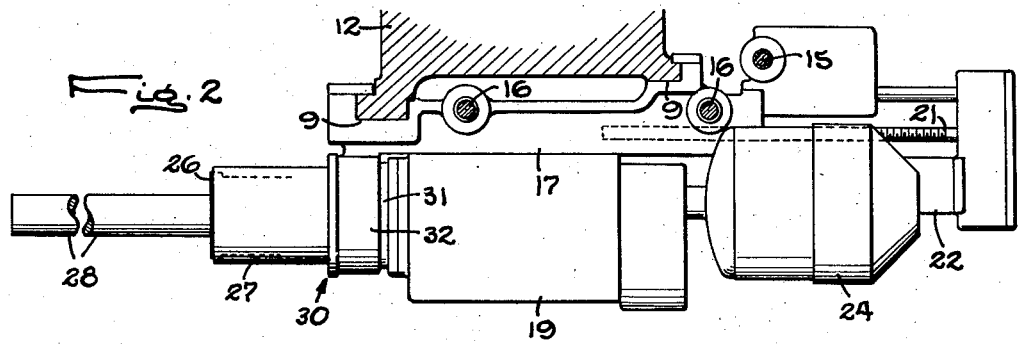
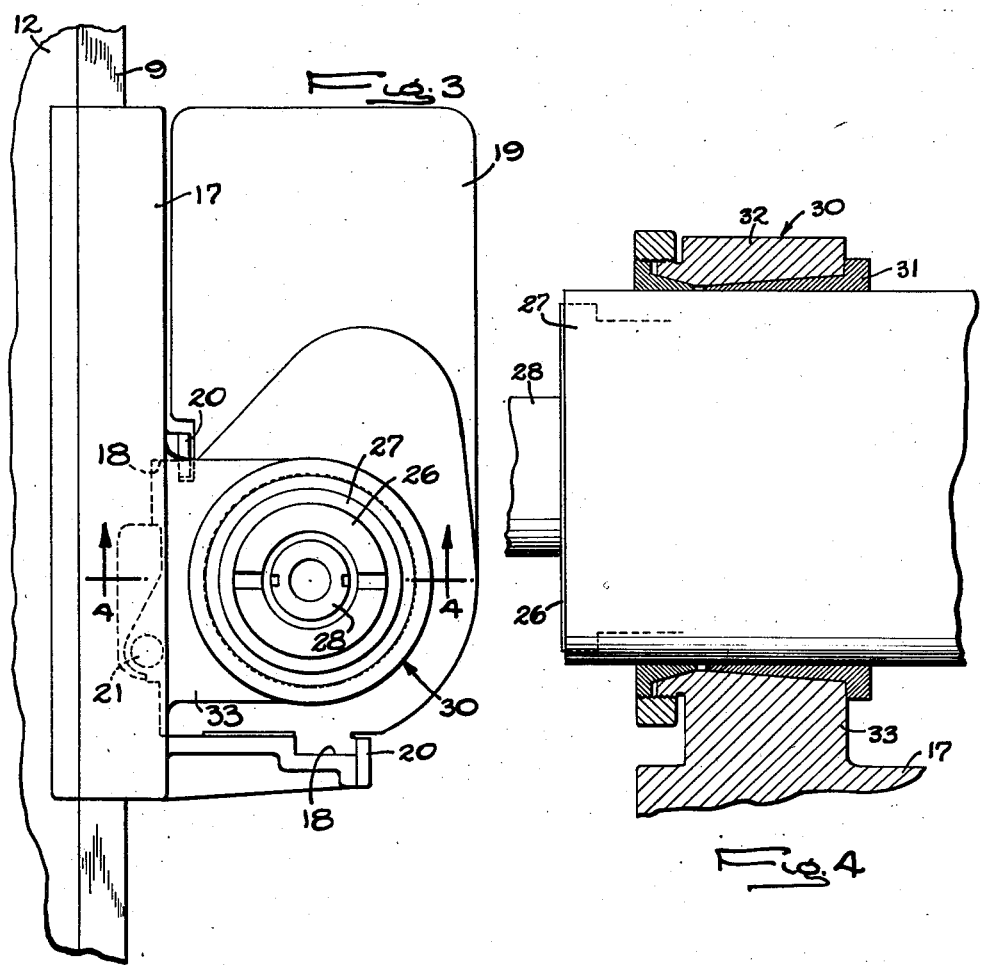
INVENTOR
Arthur W. Johnson
By Carlson, Pitzner Hubbard Wolfe
ATTORNEY Patented June 2, 1953

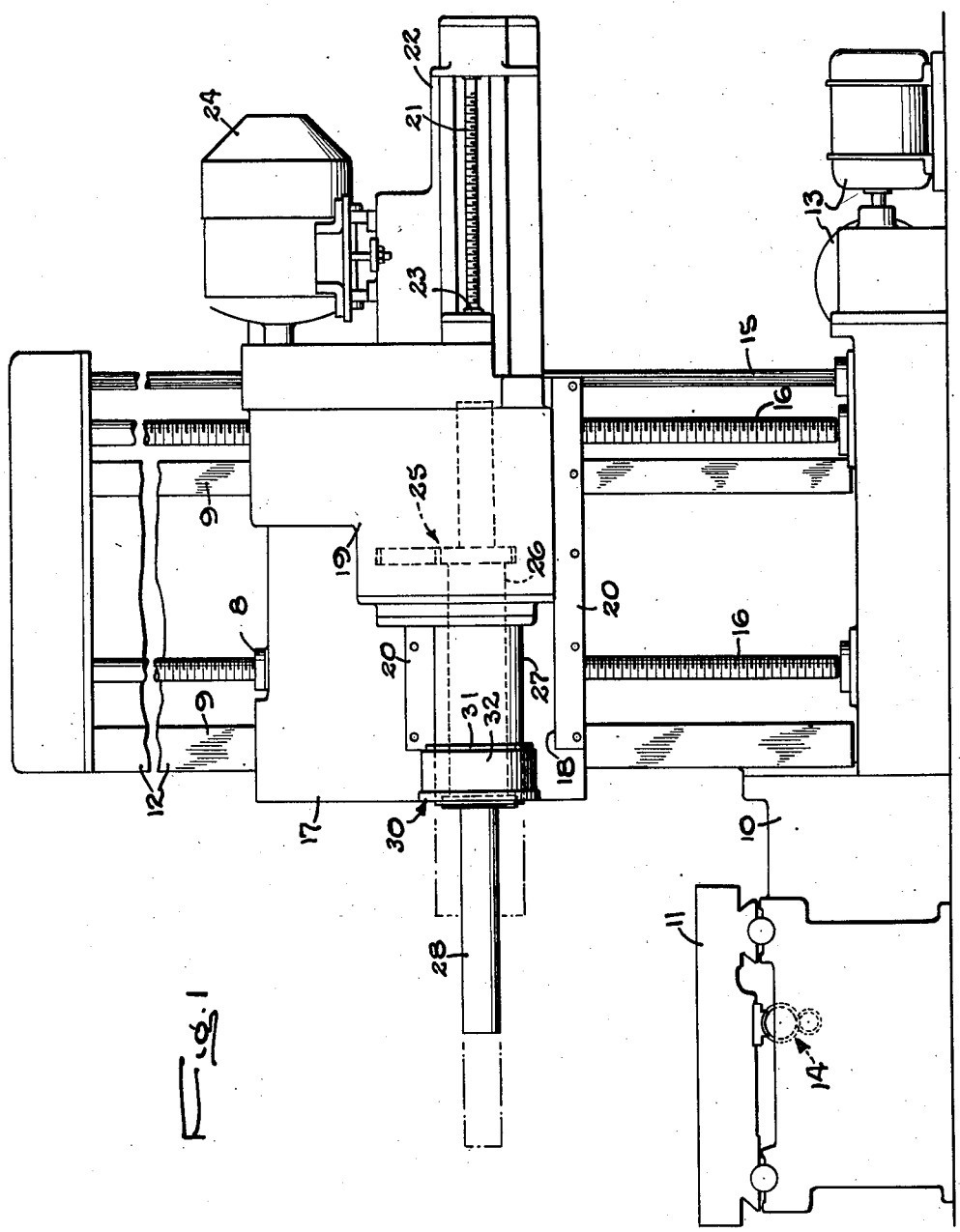

2,640,376

UNITED STATES PATENT OFFICE 2,640,376

BORING MACHINE

Arthur W. Johnson, Rockford, Ill., assignor to The Ingersoll Milling Machine Company, Rockford, Ill., a corporation of Illinois Application February 8, 1951, Serial No. 210,057

1 Claim. (Cl. 77—3)

This invention relates to boring machines particularly those of the so-called horizontal type having a cutter head slidable along ways on a movable saddle to project a cutter spindle beyond the supporting ways and to a position overlying the work support or table. In such machines, the spindle is journaled in a rigid extension or quill projecting from the end of the sliding head.

The primary object of the present invention is to reduce the amount of overhang of the quill and thus provide a more rigid mounting of the cutter when operating on workpieces disposed adjacent the supporting saddle.

A more detailed object is to provide on the supporting saddle an auxiliary guideway receiving and guiding the cutter head extension and spaced along the main guideways away from the head.

Other objects and advantages of the invention will become apparent from the following detailed description taken in connection with the accompanying drawings, in which:

Figure 1 is a fragmentary front elevational view of a horizontal boring machine equipped with an auxiliary guide structure in accordance with the present invention.

Fig. 2 is a fragmentary plan view.

Fig. 3 is a side view looking from the left in Fig. 2.

Fig. 4 is a fragmentary sectional view taken along the line 4—4 of Fig. 3.

For purposes of illustration, the invention is shown in the drawings incorporated in a so-called horizontal boring machine having a bed 10 slidably supporting a horizontal work table 11, a column 12, and the mechanism driven by motors 13 for actuating the table feed mechanism 14 and for driving a vertical spline shaft 15 and two screw shafts 16 journaled on and extending along the front face of the column. Slidable in laterally spaced vertical ways 9 on the front of the column is a saddle 17 carrying nuts 8 which receive the screws 16 by which the saddle may be raised and lowered.

Formed on the front face of the saddle and extending substantially the full length thereof are spaced horizontal ways 18 mating with complemental ways on a hollow cutter head 19 which is held against the ways by suitable clamps 20. Movement of the head back and forth along the ways 18 may be effected by a screw 21 journaled on an extension 22 of the saddle 17 and threading into a nut 23 on the head.

A motor 24 mounted at the right-hand end of the head 19 operates through suitable reduction gearing including gears 25 within the head to drive a spindle 26 journaled in a quill 27 or extension of the head rigid with and projecting a substantial distance from the left end of the head parallel to the ways 18. The end of the spindle 26 terminates slightly beyond the end of the extension 27 and is fashioned for attachment of a rotary cutter directly thereto. Usually, the spindle is a sleeve slidably receiving and spline coupled to a longitudinally slotted boring bar 28 to which a suitable cutter may be keyed for use in performing boring operations at points remote from the end of the spindle 26. The outboard end of the bar 28 may be supported in the usual tail stock (not shown) upstanding from the bed 10 on the side of the table opposite the column 12. Suitable mechanism driven from the spline shaft 15 is incorporated within the head 19 for enabling the bar to be moved axially and the length of its projecting end to be varied as desired.

In accordance with the present invention, an auxiliary guide indicated generally at 30 is disposed at the extreme left end of the saddle to slidably receive the quill 27 and thus minimize the overhang of the spindle 26 in all of the different positions of the head 19 along the ways 18. Herein, the guide 30 comprises a suitable bearing bushing 31 disposed within and clamped to a ring 32 of relatively short axial length and on a base 33 which, in this instance, is cast integral with the saddle 17 and projects rigidly from the front face of the saddle at the extreme left end thereof. Preferably, the auxiliary guide surface defined by the bushing 31 is cylindrical to receive and mate with the cylindrical exterior of the head extension 27.

When the cutter head 19 is fully retracted to the right as shown in full in Fig. 1, the end of the spindle 26 will be disposed close to the auxiliary guide 30 which then provides rugged lateral supports for the end of the head extension 27 and therefore for any cutter secured to the end of the spindle or to the adjacent part of the boring bar 28. In a similar way but to a lesser degree, the auxiliary guide improves the rigidity of the cutter mounting in the other positions of the head 19 along the guides 18, the extreme left-hand position being shown in phantom in Fig. 1.

I claim as my invention:

A boring machine having, in combination, an upright column, a saddle slidable vertically on said column, vertically spaced horizontal guideways extending along the front of said saddle, a head slidable along said guideways and having a cylindrical nonrotatable extension rigid with and projecting from one end of the head between and parallel to said guideways, a rotary spindle for supporting a boring cutter journaled in said extension and projecting beyond the free end of the extension and said saddle end, a ring rigidly secured to and projecting forwardly from said saddle adjacent the said saddle end, and a guide surface formed in said ring and slidably receiving said extension to provide rigid lateral support for the latter at a point spaced from said head.

ARTHUR W. JOHNSON.

References Cited in the file of this patent

UNITED STATES PATENTS

| Number | Name | Date |
| --- | --- | --- |
| 2,224,108 | Ridgway | Dec. 3, 1940 |

FOREIGN PATENTS

| Number | Country | Date |
| --- | --- | --- |
| 609,161 | Great Britain | Sept. 27, 1948 |